Oct. 16, 1956  R. C. RISNER  2,766,898
AUTOMOBILE CARRIER
Filed July 19, 1954  5 Sheets-Sheet 1

INVENTOR
R. C. RISNER
BY Ogle R. Singleton
ATTORNEY

Oct. 16, 1956  R. C. RISNER  2,766,898
AUTOMOBILE CARRIER
Filed July 19, 1954  5 Sheets-Sheet 2
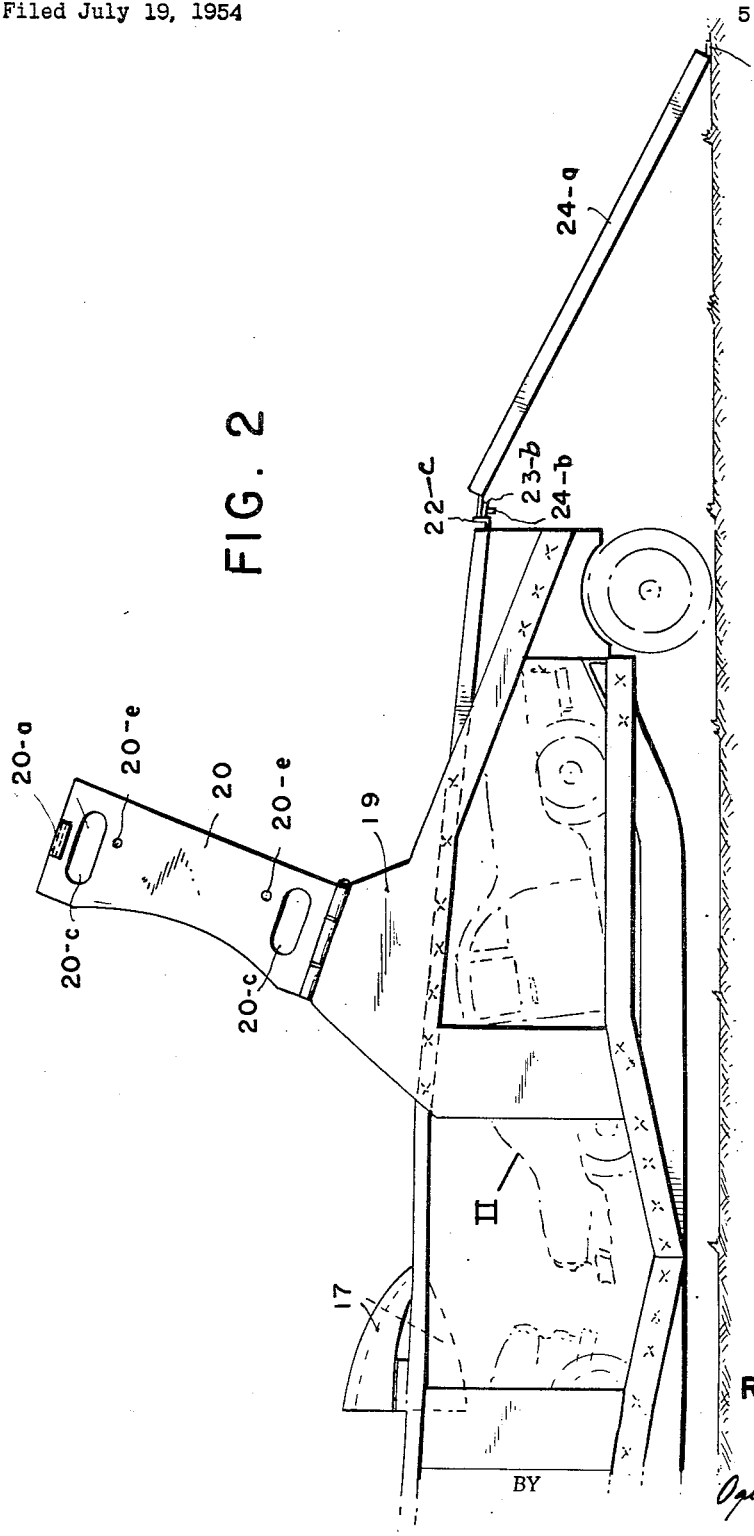
INVENTOR
R. C. RISNER
BY Ogle P. Singleton
ATTORNEY

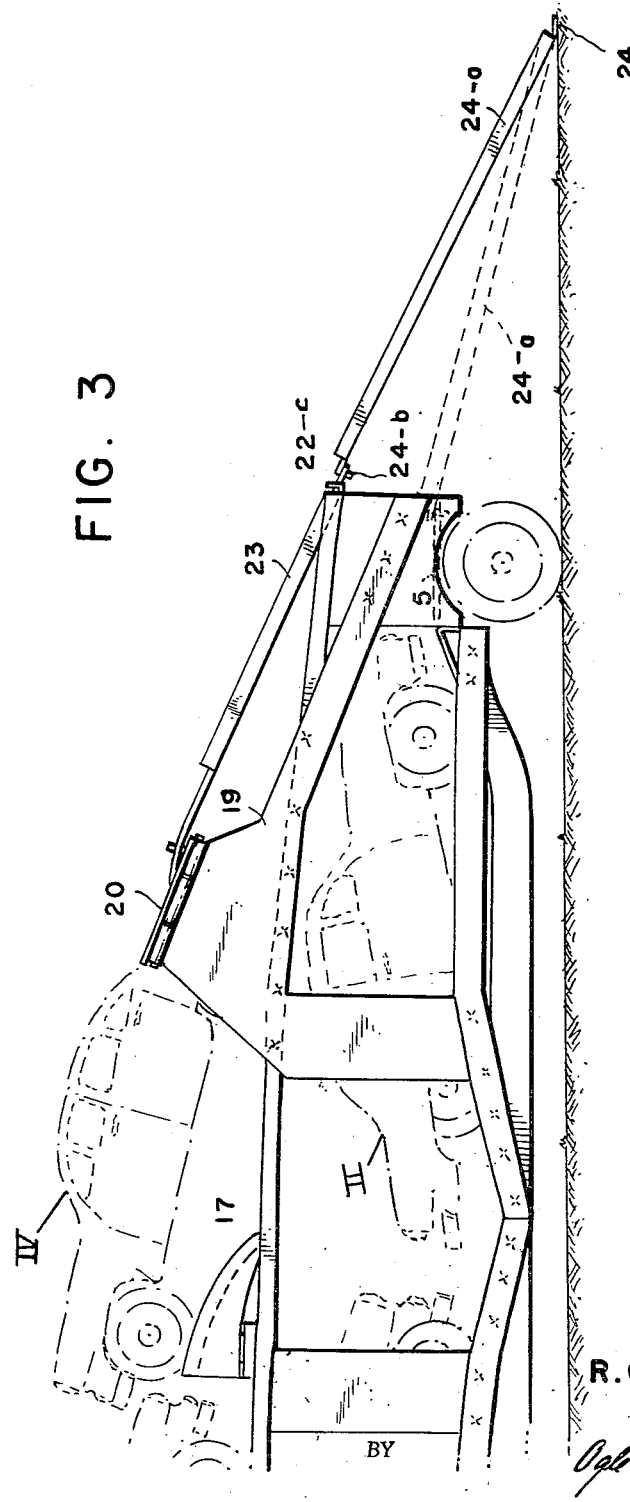

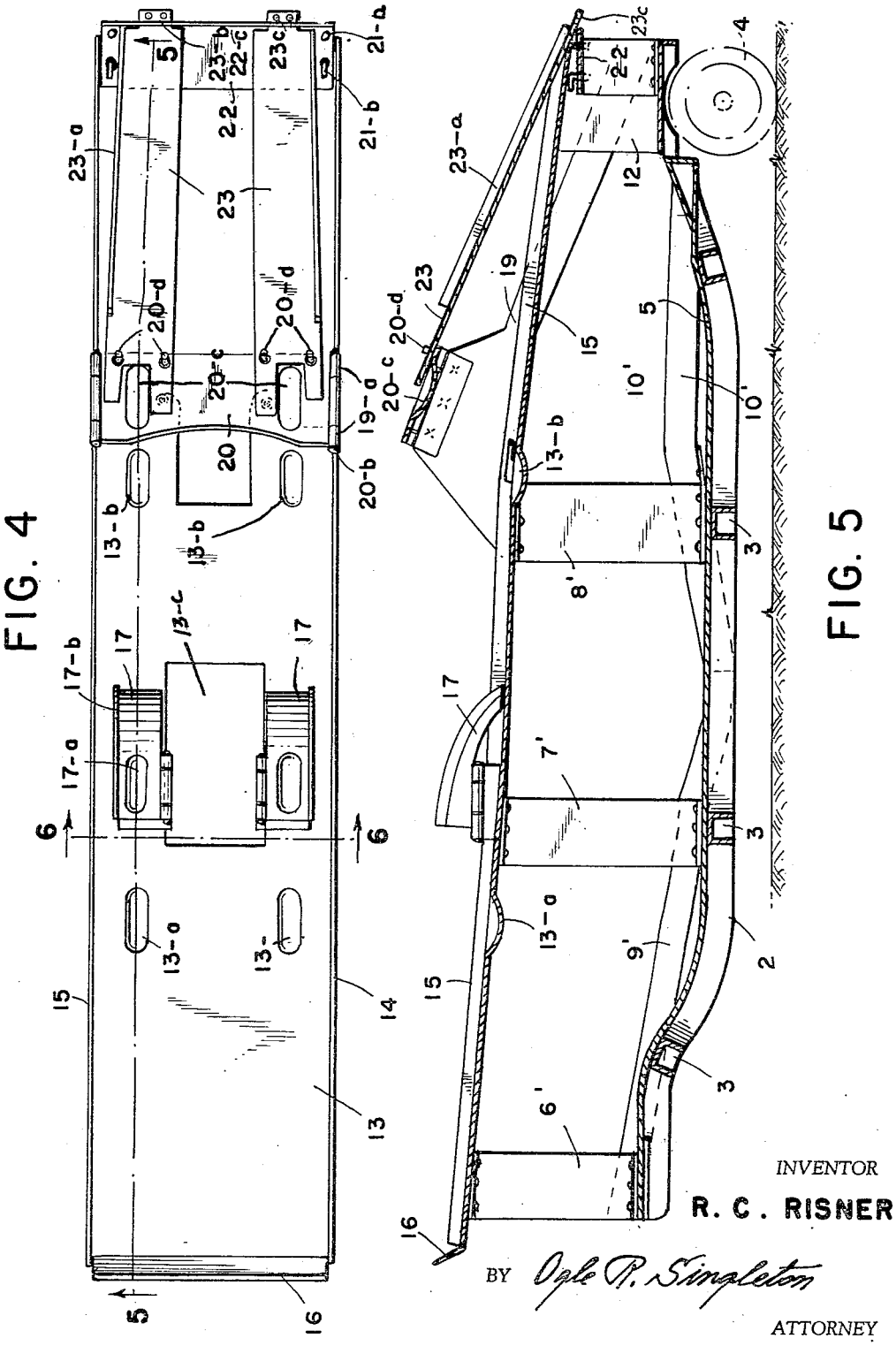

Oct. 16, 1956 — R. C. RISNER — 2,766,898
AUTOMOBILE CARRIER
Filed July 19, 1954 — 5 Sheets-Sheet 5
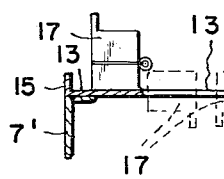
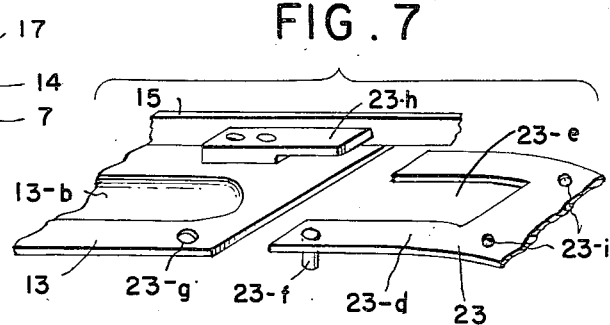
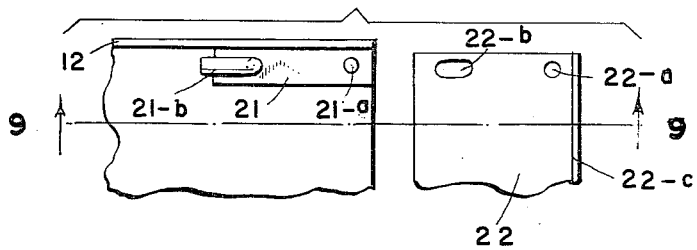
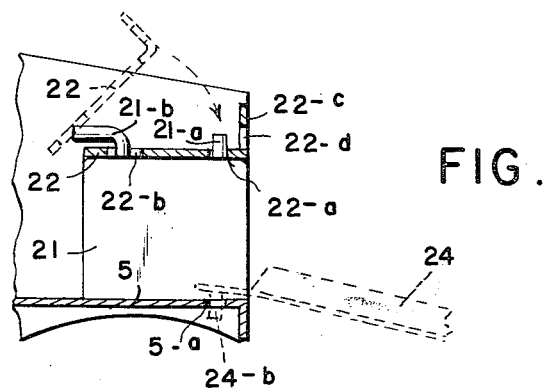
INVENTOR
ROBERT C. RISNER
BY *Ogle R. Singleton*
ATTORNEY United States Patent Office 2,766,898
Patented Oct. 16, 1956

2,766,898

AUTOMOBILE CARRIER

Robert C. Risner, Baltimore, Md.

Application July 19, 1954, Serial No. 444,064

2 Claims. (Cl. 214—85)

My invention consists in a new and useful improvement in automobile carriers and is designed to provide a trailer to be towed by a tractor coupled thereto. The particularly novel and valuably useful feature of my invention is the provision of considerably increased carrying capacity of the trailer. Moreover, this increase is afforded without materially increasing the dimensions of the trailer. While the carrier trailers now in use have a carrying capacity limited to four automobiles, two pairs stacked on two trackways, my improved trailer has the carrying capacity of five automobiles. This 25% increase is secured by the novel structure and combination of the several elements of my trailer whereby a lower, and intermediate, and upper trackway are provided.

While I illustrate in the drawings and hereinafter fully describe one specific embodiment of my invention, it is to be distinctly understood that I do not consider my invention to be limited to said specific embodiment but refer for its scope to the claims appended hereto.

In the drawings:

Fig. 2 is a fragmentary side elevation of the trailer when it is conditioned for loading the third and fourth cars on the intermediate trackway.

Fig. 3 is a view similar to Fig. 2 showing the trailer when it is conditioned for loading the fifth car on the upper trackway.

Fig. 4 is a top plan of the trailer when it is conditioned as shown in Fig. 3.

Fig. 5 is a vertical section on the line 5—5 of Fig. 4, in the direction of the arrows.

Fig. 6 is a vertical section on the line 6—6 of Fig. 4, in the direction of the arrows.

Fig. 7 is a fragmentary, enlarged perspective of the coupling means for one of the movable tracks and the intermediate trackway shown in Fig. 2.

Fig. 8 is an enlarged fragmentary top plan of the rear gate and one of the supports therefor, the parts being separated.

Fig. 9 is a vertical section on the line 9—9 of Fig. 8, the parts being united.

Figure 1:
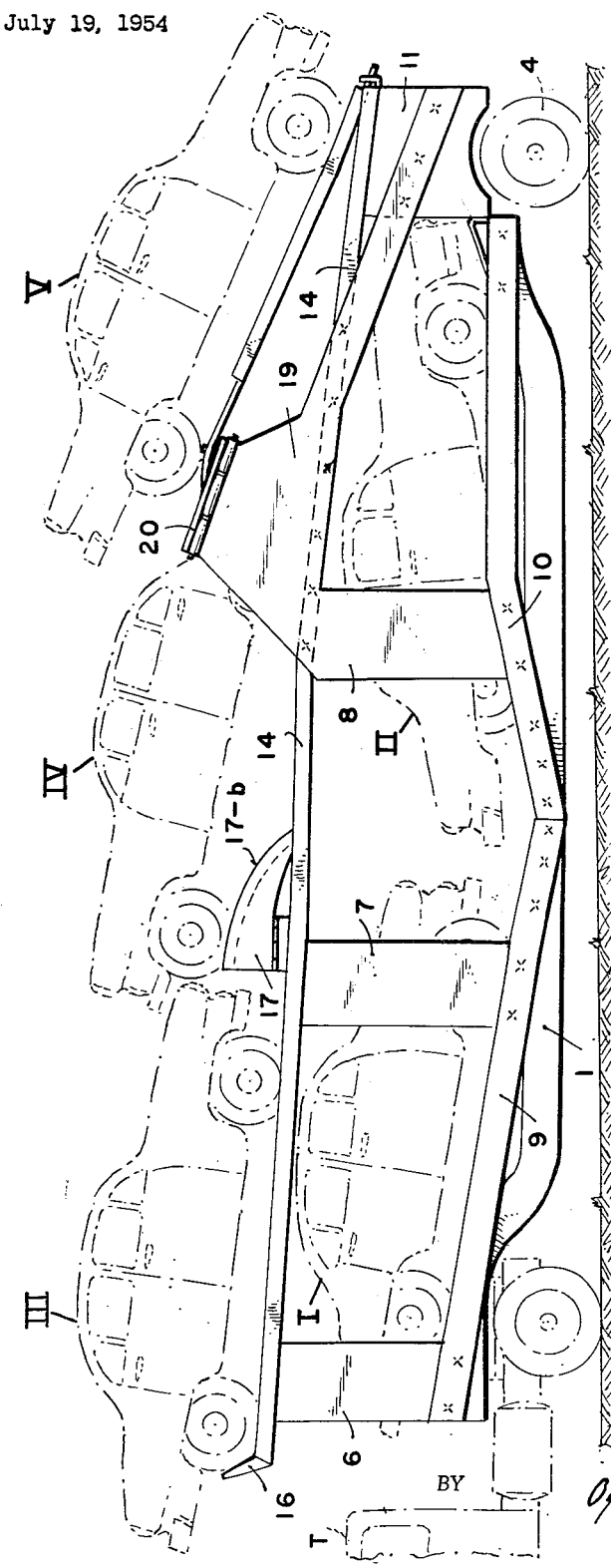
Fig. 1 is a side elevation of my improved trailer fully loaded with five cars, the tractor for the trailer and the loaded cars being shown in broken lines.

As shown in the drawings, my improved trailer has a base comprising longitudinal, side beams 1 and 2 (Figs. 1 and 5) and transverse beams 3, of ordinary U-shaped angle irons, supported at its rear by ground wheels 4 and at its front by the usual coupling with the tractor T. It will be noted (Figs. 1 and 5) that the beams 1 and 2 are so configured that the trailer is underslung between the coupling and wheels 4. Suitably mounted on the beams 1, 2 and 3 there is a lower trackway 5 (Fig. 5). Suitably mounted on the beams 1 and 2 there are two series of pillars 6, 7, 8 and 6', 7', 8', respectively. Longitudinal, strengthening ribs 9, 10 and 9', 10' are provided for the pillars. Suitably mounted on the base above the rear wheels 4 are the side walls 11 and 12. Suitably mounted on the pillars 6, 7, 8 and 6', 7', 8' there is an intermediate trackway 13 having upstanding lateral flanges 14 and 15. It will be noted that the trackway 13 (Fig. 4) extends rearwardly only slightly beyond the pillars 8 and 8' and that the flanges 14 and 15 extend rearwardly to the rear edges of the walls 11 and 12 to which they are attached. The trackway 13 has a transverse, upwardly turned flange 16 at its front end and depressions 13–a and 13–b the function of which will be presently explained. The trackway 13 has a hatch 13–c between the depression 13–a and 13–b. A pair of arcuate ramps 17 are so hingedly mounted on the trackway 13, on the sides of the hatch 13–c, respectively, as to be adapted to be disposed alternatively on the trackway 13 and in the hatch 13–c, as shown in solid lines and dotted lines in Figs. 2 and 6. The ramps 17 are provided with suitable depressions 17–a and side flanges 17–b. It is obvious that the ramps 17 can be made flexible and suitable shims can be provided to adjust the height of the tops of the ramps 17 above the trackway 13. Struts 19 connect the upper ends of the pillars 8 and 8' with the walls 11 and 12. Suitably hinged on the upper end of one of the struts 19 there is a swingable bridge 20 (Fig. 2) having on its free end a keeper 20–a co-acting with a pair of keepers 19–a on the other strut 19 for a locking pin 20–b for holding the bridge 20 in closed position (Fig. 4). It is obvious that any suitable means may be provided for fastening the pin 20–b in the keepers 19–a and 20–a. The bridge 20 has depressions 20–c, two pairs of up-standing pins 20–d and holes 20–e.

Suitably mounted on the inner face at the rear end of each of the side walls 11 and 12 there is a support 21 for the rear gate 22 (Figs. 4, 5, 8 and 9). Each support 21 has on its upper end an upstanding pin 21–a and a hook 21–b. The gate 22 has a pair of holes 22–a to receive the pins 21–a and a pair of slots 22–b to receive the hooks 21–b. The gate 22 has an upstanding flange 22–c on its rear edge provided with a pair of slots 22–d. A pair of removable tracks 23 are adapted to be alternatively mounted between the gate 22 and the rear end of the intermediate trackway 13 (Figs. 2 and 7), and the rear gate 22 and the bridge 20 (Figs. 3, 4 and 5). When the tracks 23 are disposed in the latter position, viz. connecting the bridge 20 and the gate 22, they comprise an upper trackway to receive thereon the fifth loaded car (Fig. 1). Each track 23 has a longitudinal upstanding flange 23–a, a rearwardly extending tongue 23–b having a pair of holes 23–c, and has at its front end a bifurcated portion 23–d providing a throat 23–e and having a depending pin 23–f on one tine (Fig. 7). The rear end of the trackway 13 has on each of its sides a socket 23–g to receive one of the pins 23–f, and a keeper 23–h to receive one of the tines of the bifurcated portion 23–d. Each track 23 has a pair of holes 23–i adjacent the throat 23–e to receive therein the up-standing pins 20–d on the bridge 20 when the tracks 23 are disposed to connect the gate 22 and the bridge 20 (Fig. 4). A pair of removable tracks 24 are adapted to be alternatively mounted on the rear end of the lower trackway 5 (Fig. 3) and the rear ends of the removable tracks 23 when the tracks 23 are connecting the gate 22 either with the intermediate trackway 13 (Fig. 2) or the bridge 20 (Fig. 3). It is obvious (Figs. 2 and 3) that the tracks 24 serve as means for moving the automobiles from the ground to the several trackways. Each track 24 has a longitudinal up-standing flange 24–a and at its forward end a pair of depending pins 24–b which are received in holes 23–c of the tongues 23–b of the tracks 23, and in holes 5–a (Fig. 9) in the rear end of the trackway 5.

Having described the details of construction of my improved trailer, I will now describe their use and operation.

It will be understood (Fig. 1) that car "I" and car "II" are placed on the lower trackway 5, that car "III" and car "IV" are placed on the intermediate trackway 13, and that car "V" is placed on the upper trackway formed by the bridge 20 and the tracks 23 in the position shown in Fig. 3. It will be noted that only car "IV" is headed forwardly, the other four cars being headed rearwardly in the trailer.

This peculiar disposition of the five cars produces a very desirable distribution of weight on the trailer. Since it is obvious that the greater weight of each car, provided by its engine, is forward, the peculiar disposition of the five cars provides that the heavier portions of cars "I," "III" and "IV" are placed amidship and away from the tractor coupling, and that the heavier portions of the cars "II" and "V" are placed aft above the ground wheels 4.

To load cars "I" and "II," the bridge 20 is opened, gate 22 and tracks 23 are removed, and tracks 24 are connected with the trackway 5 (Fig. 3). Cars "I" and "II" are backed up tracks 24 and into position on trackway 5. It is to be understood that suitable depressions may be provided in the trackway 5 to receive the car wheels, and that if desired adjustable guide rails on the trackway 5 may be provided.

To load cars "III" and "IV," the tracks 24 are removed, gate 22 is mounted on its supports 21 (Fig. 9), tracks 23 are mounted to connect gate 22 with the intermediate trackway 13, ramps 17 are swung downwardly into hatch 13–c and tracks 24 are connected to tongues 23–b of tracks 23 extending through slots 22–d of the gate 22 (Fig. 2). Car "III" is backed up tracks 24 and 23 and into its position at the forward end of the trackway 13, its rear wheels against the flange 16 and its front wheels in the depressions 13–a of the trackway 13. Ramps 17 are then swung upwardly to position on trackway 13 and car "IV" is driven forwardly up tracks 24 and 23 into its position, its front wheels resting in depressions 17–a of ramps 17 and its rear wheels in depressions 13–b of trackway 13.

It will be noted (Fig. 1) that when car "IV" is loaded, in its assigned place, with its rear wheels in depressions 13–b, the rear end of car "IV" is spaced considerably forward of the rear end of the trailer. It is obvious therefore that if it be desired to load my trailer with three automobiles and a truck or bus, this can be done by removing the bridge 20 and leaving the tracks 23 as placed for loading car "IV" (Fig. 2).

To load car "V," tracks 24 and 23 are removed, bridge 20 is lowered and locked in closed position, tracks 23 connect bridge 20 and gate 22, tracks 24 are connected to tracks 23 (Figs. 3, 4 and 5), and car "V" is backed up tracks 24 and 23 into its position, its rear wheels resting in depressions 20–c of the bridge 20 and its front wheels resting in depressions which may be provided in the tracks 23. The tracks 24 are then removed and stowed in any suitable place in the trailer for subsequent use in unloading, and the loaded trailer is ready to roll.

It is to be understood that when each of the cars is placed in its proper position in the trailer, it is fastened therein by the conventional chain locking means.

It will be noted (Fig. 1) that when cars "I" and "II" are loaded they are so disposed relative pillars 7, 8 and 7', 8' that free access to their front doors is afforded which is a very valuable feature facilitating loading and unloading.

It is obvious that the cars are unloaded from the trailer by reversing the above-described method of loading.

Having described my invention, what I claim is:

1. In a single trailer, adapted to be towed, for carrying automobiles, the combination of a base; a trackway on said base; a pair of upstanding walls on said base; a plurality of pillars extending upwardly from said base; a second trackway mounted on said pillars; a pair of struts connecting said walls and a pair of said pillars; a swingable bridge removably mounted on said struts; a gate removably mounted on said walls; a pair of removable tracks adapted to be mounted alternatively to connect said gate and said second trackway, and to connect said gate and said bridge to form a third trackway; and a second pair of tracks adapted to be mounted to extend from the ground upon which the trailer stands, alternatively to said first trackway and to said first mentioned pair of tracks.

2. An automobile carrier comprising a single trailer adapted to be towed and having a lower trackway for loading two automobiles in the lower part of the carrier, an intermediate fixed trackway for loading two automobiles above said first two automobiles, a removable trackway for loading a fifth automobile above one of said first two automobiles and one of said second two automobiles, and a pair of removable members adapted to provide a trackway from the ground upon which stands the carrier to one of said lower, intermediate and upper trackways.

References Cited in the file of this patent

UNITED STATES PATENTS

| | | |
|---|---|---|
| 1,809,557 | Lishon | June 9, 1931 |
| 2,492,980 | Garnett | Jan. 3, 1950 |
| 2,567,100 | Carey | Sept. 4, 1951 |
| 2,647,009 | Huebshman | July 28, 1953 |
| 2,668,734 | Bridge | Feb. 9, 1954 |
| 2,684,264 | Demos | July 20, 1954 |